(12) United States Patent
LeKuch et al.

(10) Patent No.: US 7,102,628 B2
(45) Date of Patent: Sep. 5, 2006

(54) DATA STEERING FLIP PEN SYSTEM

(75) Inventors: Scott LeKuch, New York, NY (US); Ken Inoue, Elmsford, NY (US); Dan Peter Dumarot, Cornwall, NY (US); Mary R. Seminara, Ossining, NY (US); Sreenivasulu Kesavarapu, Terrytown, NY (US); John Peter Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 09/854,979

(22) Filed: May 14, 2001

(65) Prior Publication Data

US 2002/0040817 A1    Apr. 11, 2002

Related U.S. Application Data

(60) Provisional application No. 60/238,837, filed on Oct. 6, 2000, provisional application No. 60/269,301, filed on Feb. 16, 2001.

(51) Int. Cl.
*G09G 3/28* (2006.01)

(52) U.S. Cl. .................................. 345/182; 345/173

(58) Field of Classification Search .............. 345/179, 345/180, 182, 183, 173, 174, 175; 178/19.05, 178/19.06, 19.04, 18.01, 18.04, 19.02
See application file for complete search history.

(56) References Cited

U.S. PATENT DOCUMENTS

| | | | | |
|---|---|---|---|---|
| 4,430,526 A | * | 2/1984 | Brown et al. | 345/175 |
| 5,963,199 A | * | 10/1999 | Kato et al. | 345/179 |
| 6,415,240 B1 | * | 7/2002 | Kobayashi et al. | 702/150 |
| 6,417,844 B1 | * | 7/2002 | Kodama | 345/173 |
| 6,441,810 B1 | * | 8/2002 | Skoog et al. | 345/179 |
| 6,525,749 B1 | * | 2/2003 | Moran et al. | 345/863 |
| 6,556,190 B1 | * | 4/2003 | Fleck et al. | 345/179 |

\* cited by examiner

*Primary Examiner*—Amare Mengistu
(74) *Attorney, Agent, or Firm*—Ohlandt, Greeley, Ruggiero & Perle, L.L.P.; Casey P. August, Esq.; IBM Corporation

(57) ABSTRACT

A computing system includes a handwriting input device and a computing device, the handwriting input device including an electronic pen input device having a first tip that emits a signal having a first characteristic and second tip that emits a signal having second characteristic; a detector for detecting the characteristic of the emitted signal; and a controller, interfaced with the computing device, for selectively interpreting the emitted signal as handwriting or as control information for the computing device based on the detected characteristic of the emitted signal.

7 Claims, 3 Drawing Sheets

DATA STEERING FLIP PEN SYSTEM

CROSS-REFERENCE TO RELATED APPLICATIONS

This application is related to U.S. Patent Application "EXTENDING THE GUI DESKTOP/PAPER METAPHOR TO INCORPORATE PHYSICAL PAPER INPUT", Ser. No. 09/854,978, filed on even date herewith for Applicants D. Dumarot, et al.; U.S. Patent Application "DIGITIZER COMPANION SUBSYSTEM TO EXTEND PC BATTERY LIFE", Ser. No. 09/854,980, filed on even date herewith for Applicants D. Dumarot, et al.; U.S. Patent Application "IMPROVED FRONT OF SCREEN, USER INTERFACE, AND NATIONAL LANGUAGE SUPPORT BY DOWN-LOADING BITMAPS FROM PC TO COMPANION DEVICE", Ser. No. 09/854,977, filed on even date herewith for Applicants D. Dumarot, et al; and U.S. Patent Application "THE USE OF A PAPER PAD WITH UNIQUELY IDENTIFIED PAGES IN A DIGITIZER SYSTEM", Ser. No. 09/854,976, filed on even date herewith for Applicants D. Dumarot, et al.

This application claims the benefit under 35 U.S.C. 119(e) of U.S. Provisional Application No. 60/238,837, filed on Oct. 6, 2000 and of U.S. Provisional Application No. 60/269,301, filed on Feb. 16, 2001.

BACKGROUND OF THE INVENTION

1. Field of the Invention

The present invention relates to data input devices, and more particularly pertains to data input devices having a pen interface.

2. Description of the Related Art

It is known that electronic pen input devices (e.g., an electronic stylus), can include pen input devices having two tips for performing two different functions. A function performed by such pen input devices can include acquiring user input, such as handwritten data or control input. For example, a dual-mode pen input device is known wherein one tip can be used for initiating a writing action and the second tip can be used for initiating an erasing function. Such pen input devices are used with an electronic tablet for detecting signals transmitted by the pen.

The electronic pen input device is typically interfaced with a computing device for storage, use, or transfer of the input data obtained using the pen input device. Pen input devices heretofore typically insert markers into the data stream of the acquired pen input information to indicate which tip of the pen input device is active (i.e., being used by the user). The data stream is routed from the pen input device to the computing device coupled thereto wherein the markers inserted in the data stream are used to determine which tip is active. As such, the data stream itself must be modified and a determination made to as to which tip of the pen input device is active.

SUMMARY OF THE INVENTION

It is an objective of this invention to provide an electronic pen input device system that routes entered information to different locations based on a user selected manipulation of the pen.

It is another objective of this invention to provide an electronic pen input device system that allows as a user to intuitively determine where entered information is routed.

The foregoing and other problems are overcome and the objectives of the invention are realized by methods and apparatus in accordance with the invention disclosed herein. The present invention pertains to a computing system having a handwriting input device and a computing device, the handwriting input device includes an electronic pen input device having a first tip that emits a signal having a first characteristic and a second tip that emits a signal having a second characteristic; a detector for detecting the characteristic of the emitted signal; and a controller, interfaced with the computing device, for selectively interpreting the emitted signal as handwriting or as control information for the computing device based on the detected characteristic of the emitted signal.

A user can select the tip of the electronic pen input device that is used. The present invention therefore permits a user to intuitively switch between, for example, inputting handwriting that may be stored locally and controlling cursor activity of the connected PC.

BRIEF DESCRIPTION OF THE DRAWINGS

The above set forth and other features of the present teachings are made more apparent in the ensuing Detailed Description of the Invention when read in conjunction with the attached Drawings, wherein.

DETAILED DESCRIPTION OF THE INVENTION

Figure 1:
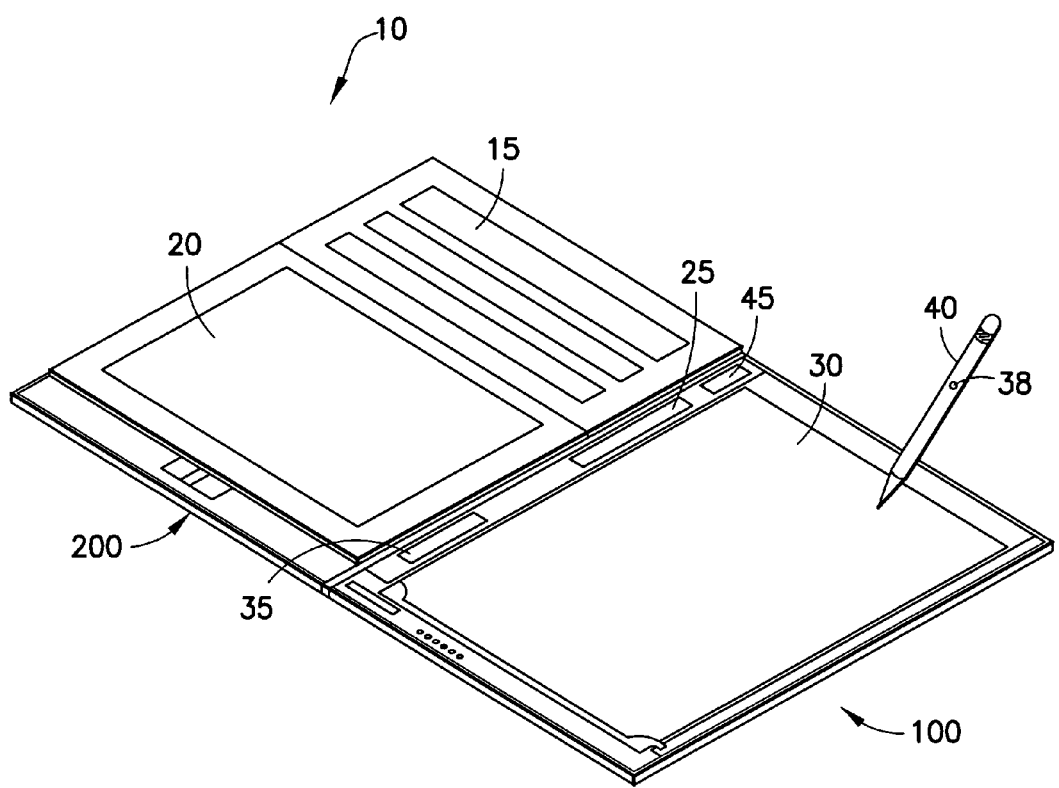
FIG. 1 depicts a computing system in accordance with the teachings herein, the system including a digitizer system interfaced with a computing device.

FIG. 1 is depicts an overview of an integrated computing system 10. Computing system 10 includes a computing device such as, but not limited to, a PC (personal computer) 200 interfaced with an input device system. The input device system is, in the presently preferred embodiment, a digitizer input system 100. PC 200 and digitizer input system 100 are shown configured in an integrated unit. The computing system 10 may be laid open as shown; folded shut; and folded over onto itself so that either PC 200 or digitizer input system 100 is operatively exposed for use by a user. Although shown together in an integrated unit, PC 200 and digitizer input system 100 can optionally be housed independently of one another. Integration of the two systems facilitates the portable nature of computing system 10, but is not a requirement for computing system 10.

PC 200 preferably includes a display screen 20, a keyboard 15, a CPU for executing operating system and application instructions, random access memory (RAM) for temporary storage of data, read only memory (ROM) for permanent storage of data, which can include instructions for implementing the PC operating system, and an internal battery (not shown) for providing an electrical source of power to PC 200. PC 200 may also include, or provide means for coupling to, peripheral devices, such as, but not limited to a network card, memory storage/playback devices (e.g., a removable magnetic disk, read/write DVD and CD-ROM players), etc.

Figure 2:
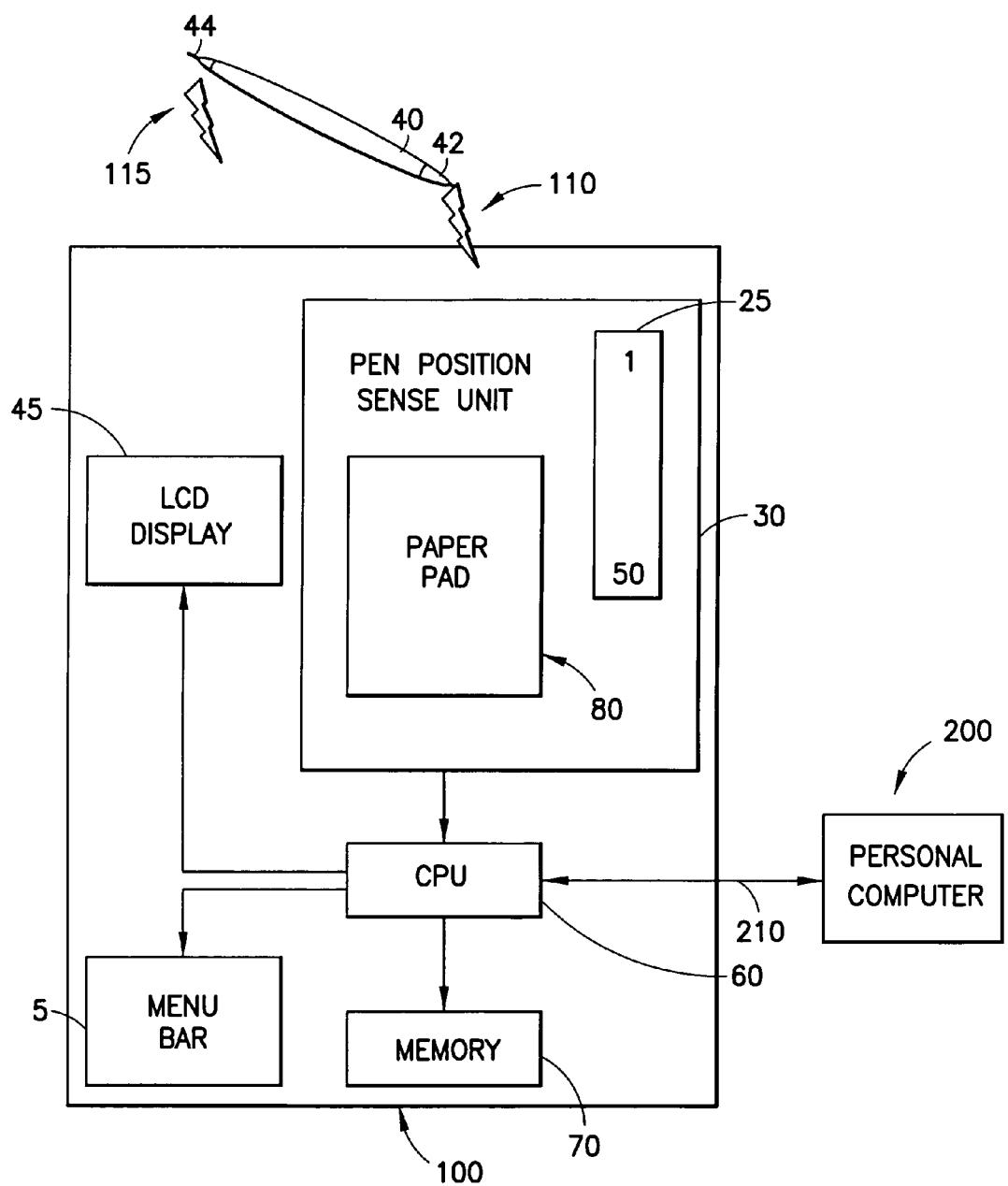
FIG. 2 is a simplified block diagram that illustrates the digitizer input system of FIG. 1 in greater detail.

Digitizer input system 100 includes a digitizer grid 30 that extends, preferably, substantially over the entire area of the digitizer input system 100, or a large portion thereof as depicted in FIG. 2, in order to provide a maximum input working area. The size of the digitizer grid 30 can be varied to meet the constraints of various applications. Digitizer input system 100 operates to track and determine the position of pen input device 40 based on RF (radio frequency) signal(s) emitted by pen input device 40. As used herein, pen input device 40 is an electronic pen input device. Digitizer grid 30 detects the position of pen input device 40 based on the relative strength and position of the RF signals emitted by the pen input device 40 in relation to digitizer grid 30. Note that the signal(s) emitted and detected by digitizer system 100 need not be limited to RF signals. Other signals such as, for example, ultrasonic and infrared signals (IR) can be employed.

The general operation of digitizer pads is known to those skilled in the art of computer input devices, and as such, will not be discussed in detail herein. In general, digitizer input system 100 tracks, determines, and records pen positions and pen strokes of pen input device 40.

FIG. 2 provides a detailed view of the exemplary computing system 10 depicted in FIG. 1. With reference to FIG. 2, it is shown that digitizer input system 100 includes a CPU 60 and a memory 70. CPU 60 may be a general purpose microprocessor, though not limited to such, for providing system logic and control of digitizer input system 100. Memory 70 is preferably flash RAM, but other forms of memory storage may be used such as, but not limited to, static RAM or a hard drive. Memory 70 provides storage capability for storing pen positions and pen strokes of pen input device 40. Digitizer input system 100 also preferably includes a display, such as an LCD display 45, for displaying information related to input data provided by pen input device 40, a menu scroll bar 25, and a menu bar 35.

CPU 60 and memory 70 provide local processing and storage, respectively, of input data provided by pen input device 40. Since digitizer input system 100 has its own local memory and processing means, PC 200 coupled to digitizer input system 100 need not be relied upon for processing and/or storage of input data received by digitizer input system 100.

Digitizer input system 100 and PC 200 are, in the presently preferred embodiment, coupled together through a bi-directional wired serial communication link 210. Communication link 210 is not limited to a wired connection or a serial communication protocol. Accordingly, communication link may be a wired or wireless communication link (e.g., IR or RF).

Paper pad 80 can be a conventional pad of paper having multiple pages and in operation is positioned on top of digitizer input system 100. Paper pad 80, positioned atop digitizer grid 30, can be written on by a user of computing system 10. Each time the tip of pen input device 40 is pressed to paper pad 80, the digitizer input system 100 begins recording the positional data points detected from the emitted RF signals from pen input device 40 and continues to record the pen input device 40 positional data until the tip of pen input device 40 is lifted from paper pad 80. The set of pen input device 40 positional data points from the time of tip press to the time of tip lift is considered to be a pen stroke. Pen strokes written and drawn on paper pad 80 are communicated to digitizer input system 100, even through multiple pages of paper pad 80, by the RF signals emitted from pen input device 40. The RF signals emitted from pen input device 40 include positional data of the "pen strokes" executed by the user of pen input device 40. Thus, the writings and drawings made on paper pad 80 can be conveyed by pen input device 40, processed by CPU 60, and stored in memory 70 as an electronic (i.e., virtual) representation of writings and drawings created by the user on paper pad 80.

In the present invention, pen input device 40 stroke information is selectively routed to either digitizer input system 100 or to PC 200 based on the pen input device 40 tip 42 or 44 used on digitizer grid 30. The stroke information may be stored in local memory 70 or memory in PC 200 depending on where it is routed. That is, pen input device 40 stroke information is routed to different locations based on the tip selected and used by the user (i.e., the active tip). Thus, the user is able to control the routing of pen input device 40 stroke information.

Pen input device 40 preferably has two different tips, tip 42 and tip 44. Dual-tipped pen input device 40, as shown in FIG. 2, preferably emits a unique RF signal 110 from tip 42 that is detected by digitizer input system 100. Detected RF signal 110 is used for determining the position of pen input device 40 when tip 42 is active. Preferably, pen input device 40 emits a different RF signal 115 from tip 44 that is detected by digitizer input system 100. Detected RF signal 115 is used for determining the position of pen input device 40 when tip 44 is active. Tip 42 can be, though not necessarily, an inking tip for writing and drawing on paper pad 80 in a conventional manner. Tip 44, emitting RF signal 115, preferably, but not necessarily, contains a non-inking tip that is used for control purposes, such as controlling user input functions of PC 200 interfaced to digitizer input system 100. Each of tips 42 and 44 preferably includes a mechanism for detecting when the tips 42 or 44 is active. That is, each tip includes a mechanism, such as a switch, for detecting when the tip is pressed down on paper pad 80 (or other writing medium) or digitizer grid 30 directly.

Exemplary RF signal 110 emitted by tip 42 can be a 500 kHz RF signal that is modulated to 480 kHz when tip 42 is active. Exemplary RF signal 115 emitted by tip 44 can be a 450 kHz RF signal that is modulated to 460 kHz when tip 44 is actively used. Digitizer grid 30 detects the relative strength and position of the pen input device's emitted RF signals as discussed above. Digitizer grid 30 also detects which tip 42 or 44 is being actively used as indicated by the modulated RF signal detected by digitizer grid 30. The positional data of pen input device 40 is communicated to a data steering device. In computing system 10 of the present example, the data steering device is implemented by microprocessor unit CPU 60, although other hardware and software devices can be used to implement the data steering device. CPU 60, in the presently preferred embodiment, is programmed to perform different functions, including routing pen input device 40 stroke information depending on which tip 42 or 44 is being actively used and the signal characteristic detected. CPU 60 directs the stroke information to either local memory 70 when the inking tip 42 is used or to PC 200 when non-inking tip 44 is used. Whether the pen input device 40 stroke information is stored locally in memory 70 or forwarded to PC 200 for storage and/or use therein for, as an example, display screen cursor control, is dependent on the pen input device tip 42 or 44 selected by the user.

Thus, the user can control where the pen input device 40 positional data is directed by manipulating pen input device 40. For example, by "flipping" the pen input device 40 the user can switch from using tip 42 located on one end of pen input device 40 to using tip 44 located on the other end of pen input device 40 depending on whether the user wants to write, capture and store virtual documents of physical writings, or to control PC 200. The user, as determined by an intuitive "flip" of pen input device 40, thus selects where the pen input device 40 output is routed. In this manner, when the user writes with tip 42 a record of what is written may be stored locally in digitizer input system 100. When the user intuitively "flips" pen input device 40 over to use non-inking tip 44, the user can, for example, control the display, including cursor control activity, of coupled PC 200 via the pen stroke data routed to PC 200 from digitizer input system 100. In this case the pen information may be interpreted by the PC 200 in a manner consistent with input received from a pointing device, such as a mouse, arrow keys on a keyboard, etc.

While pen input device 40 shown in FIG. 2 has two tips located on opposite ends of pen input device 40, pen input device 40 may have one or more tips located on the same end thereof. The various tips of pen input device 40, or other control mechanisms such as switch 38 (see FIG. 1), may generate additional signals detectable and useable by digitizer input system 100 and/or computing subsystem 10. Selection amongst the various pen input device tips by the user preferably only requires a natural, intuitive user action, such as, for example, pressing a small switch located on the barrel of the pen input device, in accordance with the teachings herein.

In further accordance with the teachings herein, the signals emitted by tips 42 and 44 are not restricted to emitting RF signals, other types of energy signals may be emitted, such as but not limited to, IR (infrared) or ultrasonic signals. In the instance the emitted signals comprise infrared (IR) signals, the light pulse frequency and light pulse position characteristics of the emitted signals can be detected. In the instance the emitted signals comprise ultrasonic signals, the frequency of the signals can be modulated and detected for determining the intended function of the input device. The type of control and user manipulation used for control of the data transfer may be varied.

The user need not perform an action apart from writing or the desired PC 200 control functions to have computing system 10 respond appropriately to the user's actions.

Written input may be forwarded for storage in a device coupled to digitizer input system 100, such as PC 200, optionally without storage in local memory 70, as the user writes on paper pad 80. To provide this functionality, CPU 60 can be programmed to steer the user's written input to PC 200 for storage as an electronic version of the user's physical writings. Note that the user's "flip" or manipulation of the pen input device tips still controls how the input data is used by the computing system 10. If the user "flips" pen input device 40 to select the non-inking tip 44, then CPU 60 transfers the pen positional data to PC 200 for storage or display therein and/or for control of PC 200.

Figure 3:
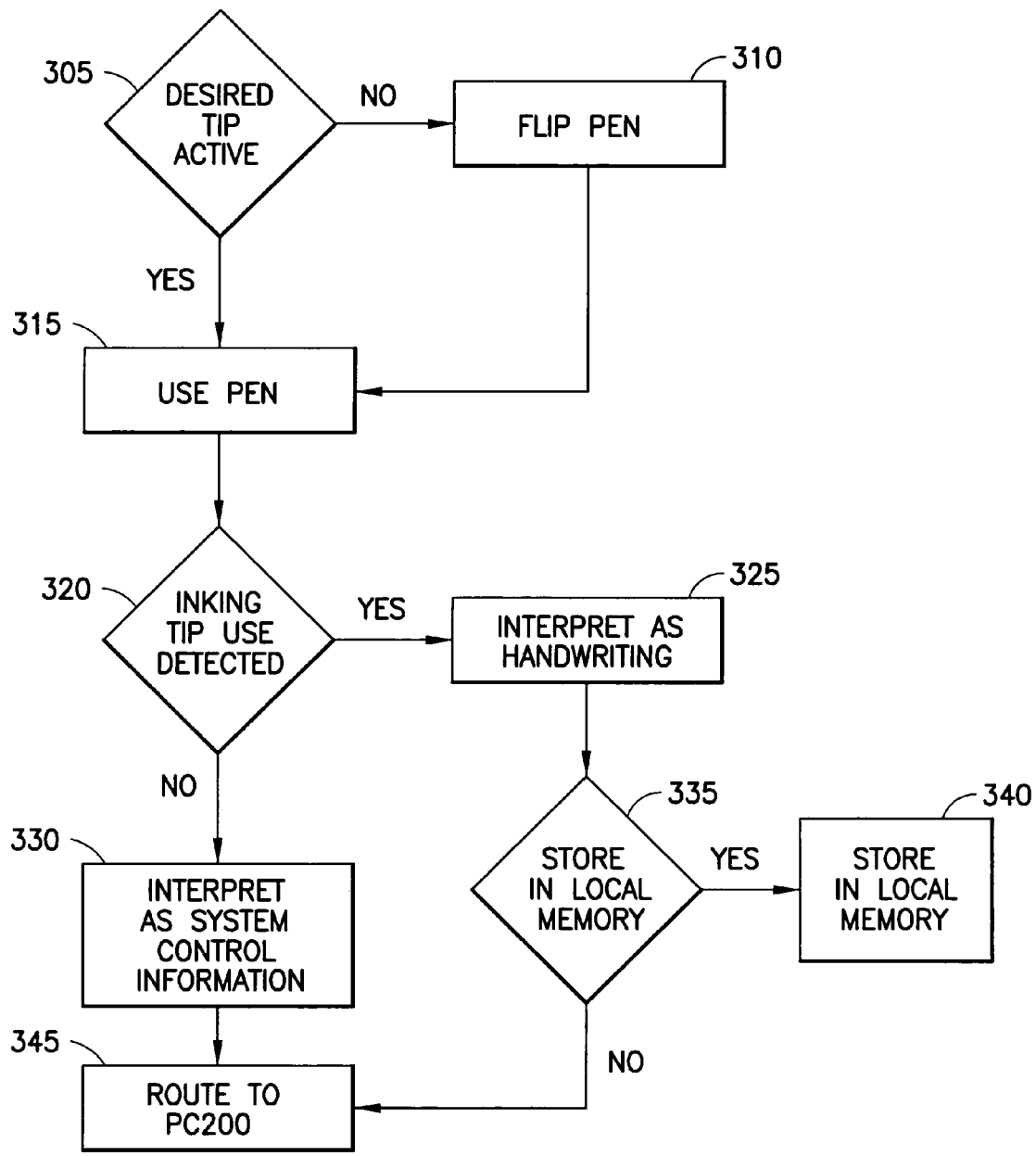
FIG. 3 is a logical flow diagram for a method in accordance with the teachings herein.

FIG. 3 shows a logical flow diagram of an exemplary method in accordance with the teachings herein. In a first step shown, a determination is made whether the desired tip of pen input device 40 is active or otherwise in a position for use (step 305). In the presently preferred embodiment, the user performs a pen flip to switch between the tips 42 and 44 located on opposite ends of pen input device 40 (step 310). Once the pen input device is the desired position for use, a next determination is made as to whether the inking tip 42 is being used for writing (step 320). In the case it is determined by CPU 60 that the inking tip is used (step 320), then the pen stroke information received is interpreted by CPU 60 as handwritten input information. The handwritten input data is either stored in local memory (step 340) or routed to PC 200 for storage, with or without buffering in local memory 70 (step 345). In accordance with the teachings herein, CPU 60 steers the data to the local memory 60 or PC 200 based on the emitted signals detected by input digitizer 100.

Referring back to step 320, in the case that the inking tip 42 is not used, then the received stroke information is interpreted as system control information by CPU 60. Being interpreted as system control information, the received stroke data is routed to PC 200 for, as an example, cursor control.

Although described above in the context of specific input device systems and companion subsystems, those skilled in the art should appreciate that these are exemplary and indicative of presently preferred embodiments of these teachings, and are not to be read or construed in a limiting sense upon these teachings.

For example, the pen input device 40 may have one or more tips located on the same or opposite ends; the writing medium for use in an input device subsystem is not limited to paper, the writing medium may also include other materials, such as a transparency, or a work surface. Furthermore, the present invention may be implemented by a computer readable storage medium. (e.g., a removable storage medium, a memory card or a hard disk) having program instructions embodied therein for executing the methods of the present invention. The computer readable storage medium can be read and the program instructions executed by the CPU 60. Accordingly, the selective interpretation and routing of pen stroke information is accomplished by program instructions that are responsive to detected signal emissions 110 of a first characteristic from a first tip 42 of the electronic pen input device 40 and emissions of a second characteristic 115 from a second tip 44 of the electronic pen input device 40; and program instructions for selectively interpreting the detected signal emissions as handwriting or as control information for the computing device 200 based on the detected characteristic of the emitted signal.

The various aspects of the teachings herein may or may not be combined in accordance with the scope of the teachings herein and the claims appended hereto. Thus, while the invention has been particularly shown and described with respect to preferred embodiments thereof, it will be understood by those skilled in the art that changes in form and details may be made therein without departing from the scope and spirit of the invention.

What we claim is:

1. A computing system, said computing system comprising:
    an input device and a computing device, said input device including a memory, a controller having a first CPU and an electronic pen input device operative to emit a first signal having a first characteristic and a second signal having a second characteristic, said computing device including a second CPU;
    a detector for detecting said characteristics of the emitted signals; and
    wherein said controller is interfaced with said detector so that said first CPU selectively interprets the emitted signals as one of information to be stored by said input device and information to be forwarded to said computing device and that routes (a) to said memory the information to be stored therein and (b) to the computing device the information to be forwarded thereto for processing by said second CPU.

2. The computing system of claim 1 comprising a switch wherein the characteristic of said emitted signal is determined by operation of said switch.

3. The computing system of claim 1, wherein said electronic pen input device comprises first and second tips that emit said first and second signals, respectively, and wherein which of said first and second signals is emitted depends on which one of said first and second tips is selected by a user.

4. The computing system of claim 1 wherein said memory comprises Flash RAM type memory.

5. The computing system of claim 1, wherein said second CPU of said computing device responds to said information forwarded thereto based on detection of said second signal to control a display of said computing device.

6. The computing system of claim 1, wherein said second CPU of said computing device responds to said information forwarded thereto based on detection of said second signal to control a function of said computing device.

7. The computing system of claim 1, wherein said first CPU interprets said first signal as information to be stored in said memory and the second signal as information to be forwarded to said second CPU.

* * * * *